UNITED STATES PATENT OFFICE.

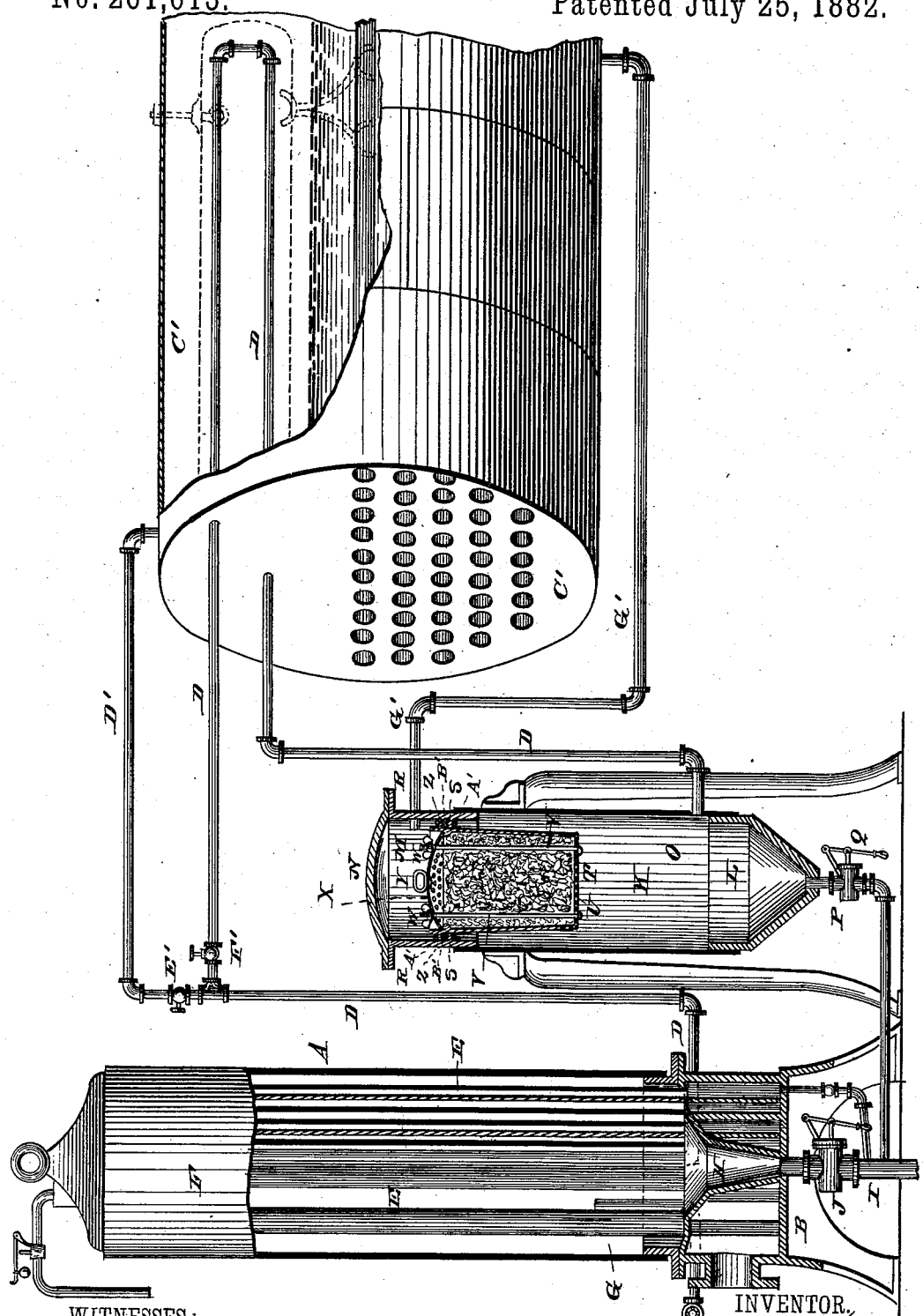

N. A. T. JONES, OF PLYMOUTH, MASSACHUSETTS.

FEED-WATER HEATER AND FILTER.

SPECIFICATION forming part of Letters Patent No. 261,613, dated July 25, 1882.

Application filed April 7, 1882. (No model.)

*To all whom it may concern:*

Be it known that I, N. A. T. JONES, of Plymouth, in the county of Plymouth and State of Massachusetts, have invented certain new and useful Improvements in Feed-Water Heaters and Filters; and I do hereby declare that the following is a full, clear, and exact description of the invention, which will enable others skilled in the art to which it appertains to make and use the same, reference being had to the accompanying drawing, which forms a part of this specification.

This invention relates to feed-water heaters and filters; and it consists essentially in certain improvements in the construction of the filtering apparatus, which may be used independently or in connection with a heating apparatus of any well-known construction.

My invention also consists in certain improved means for heating the feed-water by live steam before it enters the filter, as will be hereinafter fully described, and particularly pointed out in the claims.

The drawing hereto annexed represents a vertical sectional view of the heater and filter, showing also in perspective the boiler or generator, from the shell of which a portion has been broken away for the purpose of better illustrating the construction.

The heater, which in the drawing is denoted by letter A, may be of any suitable construction. By preference I employ the one shown in the drawing, which I have made the subject of another application for Letters Patent, and which consists of a base, B, embodying the exhaust-steam passages or compartments, and tubes E, and having the feed-water entrance and exit pipes C D, and a detachable shell, F, constituting the water-space.

The water-space G is connected by a funnel-shaped tube, H, extending centrally through the base, with the blow-off pipe I, having lever-valve J.

K is the filter, which consists primarily of a suitably-constructed tank, of which I prefer to make the bottom L, top M, and cover N' of cast and the shell O of wrought iron, bolted or otherwise secured to the top and bottom. The latter, L, is funnnel-shaped, as shown, and provided with a blow-off pipe, P, having a lever-valve, Q, and connected with the blow-off pipe I of the heater, when a heater is used. The top M has a flange, R, to which the flanged cover N may be bolted or otherwise secured. It is also provided with an interior annular flange, S.

T is a pail or receptacle, made of cast or wrought metal, and having a perforated bottom, U. The sides may also be perforated near the bottom; but this is not necessary.

Pail T is provided with rods or bolts V, projecting upwardly from the bottom, and having thumb-nuts W at their upper ends, by which a perforated cover, X, may be tightened into place in the pail, which has been previously filled with filtering material, such as charcoal or coke. The cover X has an eyebolt, Y, serving as a handle by which the device may be manipulated. The pail T is provided with an annular flange, Z, adapted to rest upon the flange S in the filtering-tank, to which it is secured by bolts A', a rubber gasket, B', or other suitable packing being interposed in order to make a tight joint. By this construction it will be seen that by simply removing the cover N and bolts A' (or such other fastening device as may be substituted) the filtering-pail T may be easily lifted out and its contents cleaned or renewed; or a duplicate pail ready packed may be substituted.

C' is the steam-generator, which may be an ordinary boiler of any suitable construction.

The feed-water pipe D, which takes the water from the heater A, is connected to the steam-space of the generator, into which it passes any suitable distance and back, thus subjecting the feed-water passing through said pipe to the action of the live steam in the boiler, whereby it is heated to a degree nearly equal to that of the water in the boiler. The feed-pipe D then conveys the water to the filtering-tank K, to which it is connected near its lower end.

If thought necessary or desirable, the feed-pipe D may be suitably coiled within the boiler; or a suitably-constructed tank (shown in dotted lines in the drawing) may be located in the steam-space of the boiler, either suspended from the latter or supported upon the tubes, and the pipe D may be connected, as shown, to said tank. In this manner the feed-water may be exposed for a longer period to the heating action of the live steam.

D' is a pipe connecting the feed-pipe D with the steam-space of the generator, and provided with a valve, E'. The feed-pipe D also has a valve, F', located between the point at which it enters the steam-space of the generator and the T-coupling which connects it with the pipe D'.

G' is a pipe connecting the upper end of the filtering-tank with the water-space of the steam-generator.

The operation of my invention is as follows: The feed-water, coming either from the exhaust-steam heater A or direct from the pump, is conveyed through pipe D, in which, during its passage through the steam-space of the generator, it is heated to an extreme degree before it enters the filtering-tank K. Passing upward through the latter and through the filtering material in pail T, it is filtered while in a heated state before it enters through pipe G' the water-space of the generator. By closing the valve F' and opening valves E' J live steam is directed through the heater A, which may thus be blown off dry. By closing valve F' and opening valve Q the flow of water in the filtering-tank is reversed, the hot water passing from the boiler (out of which it is forced by the pressure of the steam) back through the filtering-pail T, the contents of which are thus cleaned, and out through the blow-off pipe P.

Having thus described my invention, I claim and desire to secure by Letters Patent of the United States—

1. In a feed-water heating and filtering apparatus, the combination of the filtering-tank, having a filter located in its upper end, with a feed-pipe passing through the steam-space of the generator, or connected with a reservoir located therein, before delivering the feed-water in the lower end of the filtering-tank, as set forth.

2. In a feed-water heating and filtering apparatus, the combination, as set forth, of the exhaust-steam heater, the steam-generator, the filter, and the feed-pipe taking the feed-water from the heater and conveying it through the steam-space of the generator before it delivers it into the filter.

In testimony that I claim the foregoing as my own I have hereunto affixed my signature in presence of two witnesses.

N. A. T. JONES.

Witnesses:
T. D. KETLER,
JOHN S. TAGGART.